United States Patent [19]

Agar

[11] Patent Number: 5,099,697
[45] Date of Patent: Mar. 31, 1992

[54] TWO AND THREE-PHASE FLOW MEASUREMENT

[75] Inventor: Joram Agar, Grand Cayman, Cayman Islands

[73] Assignee: Agar Corporation Ltd., Grand Cayman, Cayman Islands

[21] Appl. No.: 614,505

[22] Filed: Nov. 16, 1990

Related U.S. Application Data

[63] Continuation-in-part of Ser. No. 502,691, Apr. 2, 1990, abandoned.

[51] Int. Cl.$^5$ .............................................. G01F 1/74
[52] U.S. Cl. ..................................... 73/861.04; 73/195
[58] Field of Search ............................. 73/195, 861.04

[56] References Cited

U.S. PATENT DOCUMENTS

| | | | |
|---|---|---|---|
| 3,643,507 | 2/1972 | Garrett | 73/861.04 |
| 4,050,896 | 9/1977 | Raffel et al. | 73/195 |
| 4,055,082 | 10/1977 | November | 73/861.04 |
| 4,168,624 | 9/1979 | Pichon | 73/195 |
| 4,760,742 | 8/1988 | Hatton | 73/861.04 |
| 4,776,210 | 10/1988 | Baillie et al. | 73/861.04 |
| 4,881,412 | 11/1989 | Northedge | 73/861.04 |

*Primary Examiner*—Herbert Goldstein
*Attorney, Agent, or Firm*—Oblon, Spivak, McClelland, Maier & Neustadt

[57] ABSTRACT

A device for measuring multi-phase fluid flow includes first and second flow meters connected in series for measuring a first and second fluid flow and providing first and second signals indicative of the first and second fluid flow. The device further includes a flow restrictor located between the first and second flow meters and first and second pressure measurement means operatively connected to each of the flow meters. The device enables the measurement of multi-phase flow without the need for physically separating the different fluid flows.

2 Claims, 3 Drawing Sheets

TWO AND THREE-PHASE FLOW MEASUREMENT

The present invention is a continuation-in-part of parent application Ser. No. 07/502,691, filed Apr. 2, 1990, now abandoned.

BACKGROUND OF THE INVENTION

1. Field of the Invention

The present invention relates to the on-line measurement of a two-phase flow or a three-phase flow which does not require the physical separation of the flow of gas from the flow of liquid.

2. Description of the Related Art

The measurement of two-phase flow (gas and liquid flowing together) is very difficult as conventional flow meters cannot handle both gas and liquid simultaneously. Conventional flow meters are divided into three categories: Differential pressure type, volumetric type and mass flow type. The first category comprises orifice plates, venturi tubes, pitot tubes, etc. The second category comprises turbines, positive displacement, magnetic flow meters, etc. While in the third category one finds vibrating type (corollis), heat transfer, momentum type etc.

The first category yields differential pressure output, which is related to the velocity of flow at the downstream pressure tap point, according to Bernoulli's equation $$\Delta p = \rho v^2 / 2g \tag{1}$$

where $\Delta p$ = differential pressure across the device, $\rho$ = density of the fluid at the downstream pressure tap, $v$ = velocity of the fluid at the downstream pressure tap, $g$ = gravitational constant.

Thus a change in the gas/liquid ratio will affect the density $\rho$ and will appear as a change in velocity. As it is important to know how much gas and how much liquid flow through the meter, this type of flow meter cannot give the answer.

The instruments of the second category cannot distinguish between gas and liquid, and give nearly equal flow rate to both. Again they are unable to determine how much gas and how much liquid pass through them if the flow consists of a two-phase fluid.

The third category suffers from the same disadvantage, plus the added inability of the vibrating type mass flow meters to vibrate properly when the gas content in the fluid exceeds 20% by volume.

As none of the above techniques can resolve the fluid's components, it was required in the past to physically separate them, and then measure each component separately. Two types of separators are known. The old two-phase separator, and a new dynamic separator. The first one slows the incoming fluid, allows the gas to expand, and measures the gas outlet from the top and the liquid outlet from the bottom. If the fluid is made of three components, such as oil and water and gas, a further analysis of the discharged liquid is performed. In the second case, two inclined tubes are used. The gas tends to collect in the upper one, while the liquid flows in the bottom one. Again, in the case of a three-phase fluid, further analysis of the oil/water content is required.

The big draw back of these methods is their size and the delay that they cause in the measurement. In order to allow the small gas bubbles to float up in the liquid, sufficient time must be allowed. The rate at which the bubbles float upwards, is determined by Stoke's Law:

$$v_T = k(\rho_L - \rho_g)d^2/\mu \tag{2}$$

where $v_T$ = the terminal velocity of the bubble, $k$ = Dimensional Constant, $\rho_L$ = Density of the liquid, $\rho_g$ = Density of the gas, $\mu$ = Viscosity of the liquid, $d$ = Diameter of the bubble.

Thus, in highly viscous liquids, the terminal velocity is very slow and longer time is required for the separation, i.e., the vessel size must increase, and with it the costs.

Most oil wells produce gas, oil and liquid simultaneously. Each component of such a three-phase fluid is required to be measured for fiscal and operation reasons. It is very uneconomical to build multiple separating vessels to measure each well. There is a large economic demand to perform these measurements in the field at low cost. In the case of sub-sea level wells and offshore platforms, size is also at a premium. There is therefore a big demand to measure all three components, without having to physically separate them.

SUMMARY OF THE INVENTION

Accordingly, an object of the present invention is to provide for a novel device for measuring multi-phase fluid flow without the need to physically separate the gas from the liquid.

The present invention solves the above mentioned problems by providing for a device for measuring multi-phase fluid flow comprising first and second flow meters connected in series for measuring a first and second fluid flow and providing first and second signals indicative of the first and second fluid flows; a flow restrictor located between the first and second flow meters for restricting a fluid flow between the first and second flow meter; and first and second pressure measurement means operatively connected to each of the flow meters for providing first and second signals indicative of a pressure in each of the flow meters.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
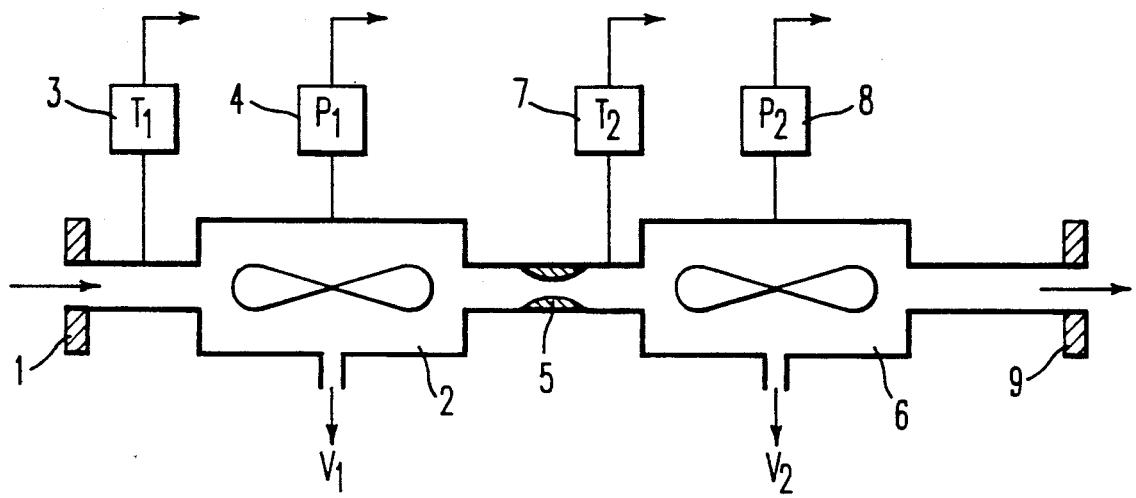
FIG. 1 shows an on-line two-phase flow meter.
Figure 1A:
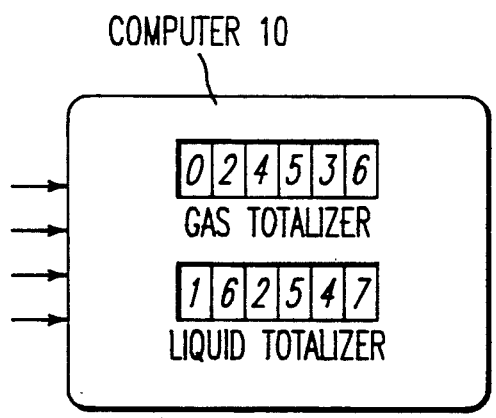
FIG. 1(a) shows a computer for measuring the outputs of the flow meter illustrated in FIG. 1.

FIG. 1 describes an on-line measurement of a two-phase flow output without the need to physically separate the gas from the liquid. The fluid (liquid & gas) enter the flow meter at port (1). The total flow is measured volumetrically by flow meter (2) whose output $V_1$ is connected to computer (10) (FIG. 1(a)). The temperature $T_1$ and pressure $P_1$ are measured by thermometer (3) and pressure transducer (4). The flow then passes through restrictor (5) which causes it to drop its pressure to $P_2$. The gas in the fluid is thus caused to expand, and flow meter (6) therefore indicates a larger volumetric flow $V_2$. The temperature $T_2$ and pressure $P_2$ are measured by (7) and (8) respectively. The fluid leaves the flow meter at port (9).

The volumetric flow is illustrated as follows:

$$V_1 = G_1 + L;\ V_2 = G_2 + L \qquad$$

where:

- $V_1$ = Total volume of fluid passing through 1st flow meter in 1 sec.
- $G_1$ = Total volume of gas passing through 1st flow meter in 1 sec.
- $V_2$ = Total volume of fluid passing through 2nd flow meter in 1 sec.
- $G_2$ = Total volume of gas passing through 2nd flow meter in 1 sec.
- $L$ = Total volume of liquid passing through both flow meters in 1 sec.

If no gas is present, $V_1 = V_2$ as the liquid is incompressible, and the same volume that enters port (1) must leave port (9). If, however, some gas is present, its volume will expand according to Charles & Boyle's Law, and therefore the flow rate in flow meter (6) will be greater than in flow meter (2). In other words:

$$V_1 < V_2 \qquad (3)$$

The increase in volumetric flow is therefore proportional to the amount of gas in the liquid.

The difference between the two flow meters is attributed only to the gas, as the amount of liquid loss due to evaporation is very small if the restrictor (5) does not drop an unacceptable amount of pressure.

Thus the relation between the gas at (2) and (6) is given by Charles & Boyle:

$$P_1G_1/T_1 = P_2G_2/T_2 = (P_2+\Delta P)G_1/T_1 = P_2(G_1+\Delta V)/T_2 \qquad (4)$$

where $$\Delta P = P_1 - P_2 \text{ and } \Delta V = G_2 - G_1$$

Rearranging Equation 4, we get $$\frac{(P_2+\Delta P)T_2}{P_2 T_1} = \frac{G_1+\Delta V}{G_1} = \left(1+\frac{\Delta P}{P_2}\right)\frac{T_2}{T_1} = 1 + \frac{\Delta V}{G_1} \qquad (5)$$

for $T_1 \simeq T_2$ a situation one can easily achieve by lagging both flow meters, and mounting them closely together, we get:

$$\Delta P/P_2 = \Delta V/G_1 \text{ or } \Delta V = G_1 \Delta P/P_2 \qquad (6)$$

If the fluid is only gas, $$V_{a1} = G_1\ V_2 = G_2 \qquad (7)$$

This will give the maximum increase in volume: $\Delta x = \Delta v$max i.e., when $$V_1 = G_1,\ \Delta V max = \Delta V = V_2 - V_1 \qquad (8)$$

In other words:

$$\Delta v\ max = V/\Delta P/P_2 \qquad (9)$$

If the fluid contains half gas and half liquid, then $\Delta V = \tfrac{1}{2}\Delta V$ max.

Hence $\Delta V$ varies from zero for the case of all liquid, to $\Delta V/\Delta V$ max for the all gas case. Thus, the ratio of $\Delta v/$vmax yields the ratio of gas/liquid at the working conditions of $P_2$ and $T_2$.

Now $G_1 + \Delta V = G_1 P_1/P_2;\ G_1[(P_1/P_2) - 1] =$ $$V_2 - V_1 = G_1 \Delta P/P_2$$

Or:

$$G_1 = \frac{P_2}{\Delta P}(V_2 - V_1)$$

$G_1$ = Volume of gas in the fluid of 1st meter  (10)

The liquid portion in $V_1$ is $L = V_1 - G_1$ $$L = V_1 - (\tfrac{1}{2} - V_1)P_2/\Delta P \qquad (11)$$

The amount of gas in the 2nd flow meter is:

$$G_2 = G_1 + (V_2 - V_1) = (V_2 - V_1)(1 + P_2/\Delta P) \qquad (12)$$

The gas to liquid ratio is given by:

$$G/L = [(V_2-V_1)P_2/\Delta P]/[V_1(V_2-V_1)P_2/\Delta P] \qquad (13)$$

The outputs of all the measuring devices are fed to computer (10) which performs the above calculation. It can also extrapolate from $P_2$ and $T_2$ to $P_3$ and $T_3$ and thus predict the final volume of oil in a tank which is open to atmosphere, at standard pressure and temperature, say one bar and 15.5° C.

Figure 2:
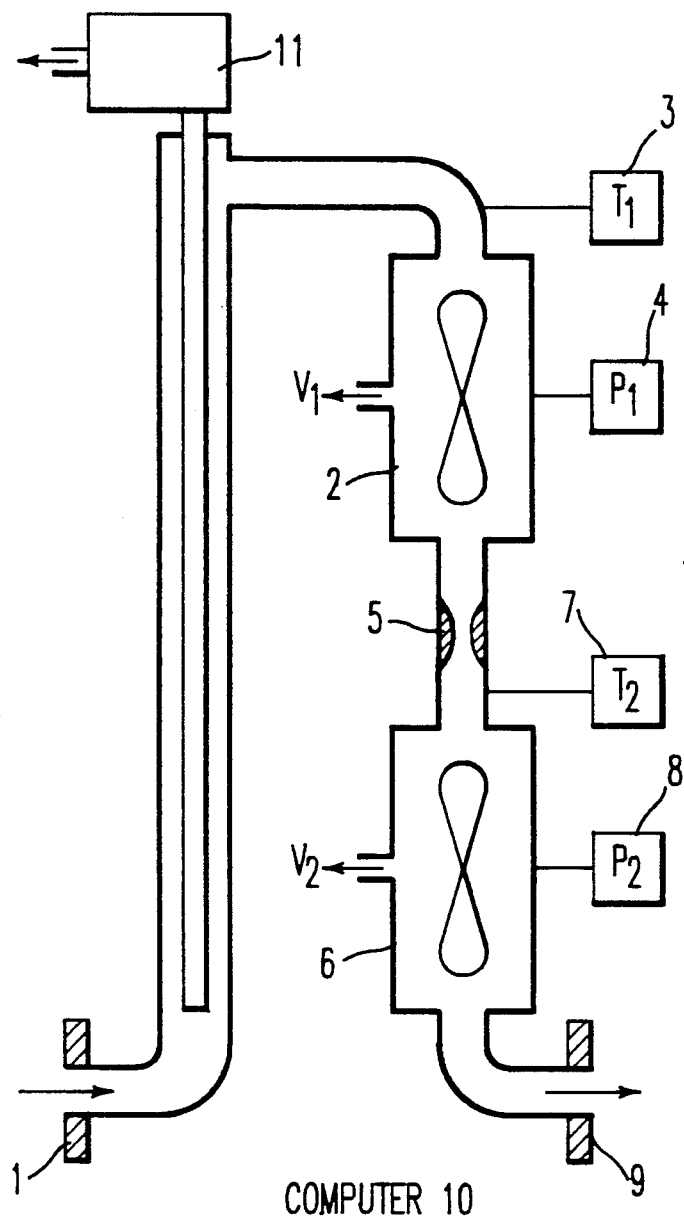
FIG. 2 shows a three-phase flow meter with an electronic oil/water monitor.

The configuration illustrated in FIG. 2 is used when the liquid consists of immiscible liquids such as oil and water. Thus, while the configuration of FIG. 1 can determine how much gas and how much liquid flow in a line, the addition of an electronic oil/water monitor (11), such as disclosed in U.S. Pat. No. 4,503,383 is needed to analyze the ratio of the water to the total liquid. As gas appears to such instrument as oil, if we know what is the percent of gas in the liquid, we can determine how much of this liquid is oil. For example, if we have determined that the gas/liquid ratio according to equation 13 is about 40%, and the oil/water monitor (11) is reading about 42% water, we know that only 60% of the 40% remainder is liquid, i.e., the composition consists of $$42\%\ \text{water \& } 40\%\ \text{gas } 18\%\ \text{oil} \qquad (14)$$

Figure 2A:
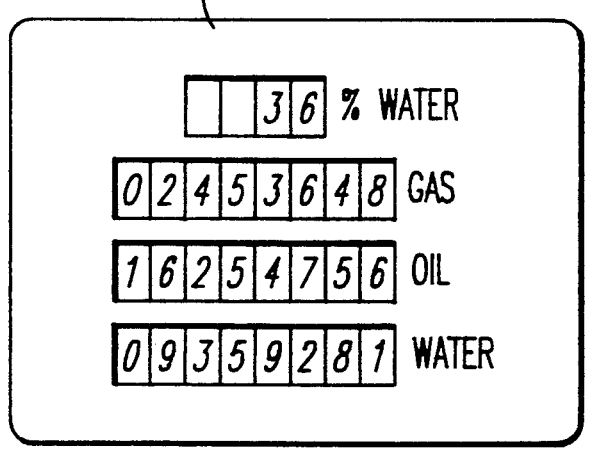
FIG. 2(a) shows a computer for measuring the outputs of the flow meter of FIG. 2.

Thus the configuration shown in FIG. 2 can further resolve the third component and yield an output as shown on the display of computer (10) (FIG. 2(a)): % water and totalized gas, oil and water.

Figure 3:
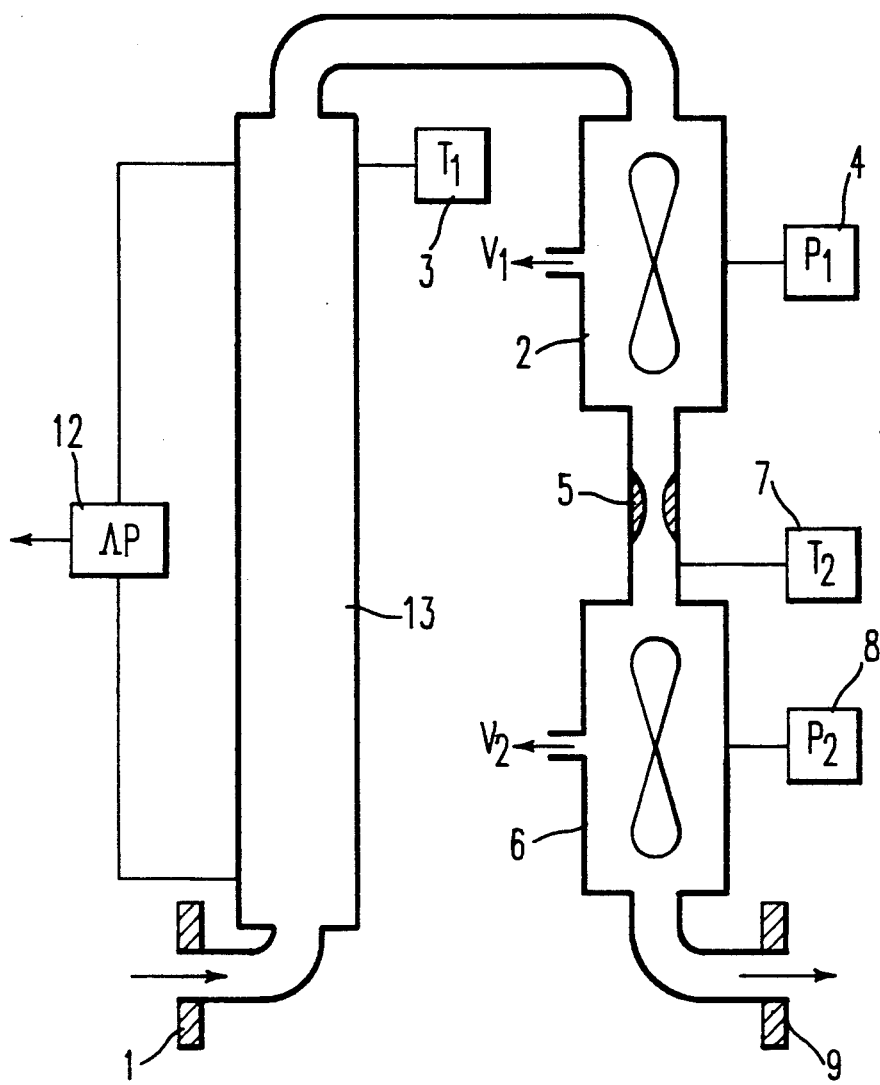
FIG. 3 shows a three-phase flow meter with a density type oil/water monitor.

In FIG. 3, the oil/water monitor is replaced by a vertical container (13), and a differential pressure transducer (12). The cross section area of this container is bigger than the pipe leading to it, to minimize the effect of any pressure loss due to drag of the fluid. The differential pressure $\Delta p$ is thus a direct function of the fluids density $\rho$ as stated in Equation (15).

$$\Delta p = \rho h; \rho = \Delta P/h \qquad (15)$$

Where h is the height of container (13).

The density of the liquid is then given from equation (16a) as:

$$\rho_l = \rho V_1/L \qquad (16a)$$

$$S_L = S V_1 L \qquad (16b)$$

wherein $\rho_L$ and $S_L$ are defined below.

The actual density of the liquid is corrected to standard temperature by means of thermometer (3).

$$S_L = P_L/[1 - \alpha(T_1 - T_S)]\rho_w \qquad (17)$$

Where
$S_L$ = Relative density (S.G.) of the liquid factoring in the temperature coefficiency
$\rho_L$ = Computed density of the liquid, taking into account the percent gas in the liquid (absolute density in which the temperature coefficient is not considered) (equation 16a)
$\alpha$ = Thermal expansion of the liquid
$T_1$ = Temperature of the liquid
$T_S$ = Standard temperature The percent water in the mixture is then computed as follows:

$$100(S_L - S_O)/(S_W - S_O) = \%W \qquad (18)$$

Where
$S_W$ is the relative density of the process water
$S_O$ is the relative density of the process oil
$S_L$ is the relative density of the mixture without gas
$S$ is the relative density of the mixture with gas

EXAMPLE

If the $S_W$ of the water is 1.1 and the $S_1$ of the pure oil is 0.9, then if the measured S of the mixture is S=0.8 and from the flow difference at the flow meters (from eq. 11) we find that L/V ratio=0.75 (i.e. 25% gas within liquid) by substituting $S_{L=SV1}/L$ (eq. 16b) into eq. 18 for $S_L$ we get:

$$100((0.8/0.75) - 0.9)/(1.1 - 0.9) = 83\% \text{ water in the liquid.}$$

Figure 3A:
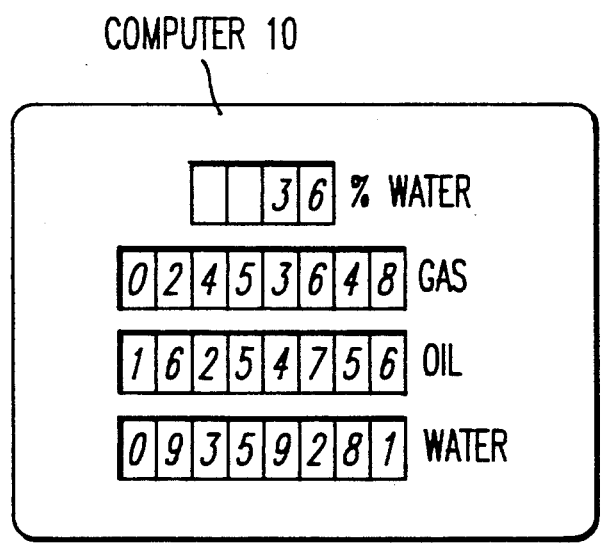
FIG. 3(a) shows a computer for measuring the outputs of the flow meter of FIG. 3.

In this example, the % water is $0.83 \times 75\% = 62\%$ water so that the well is producing; 62% water + 13% oil + 25% free gas at the operating conditions. At lower pressures, the ga will expand ($G_3$) to a value which can be extrapolated by the computer (10) FIG. 3(a)).

$$G_3 = \frac{P_1}{P_3} \frac{T_3}{T_1} G_1 \qquad (19)$$

Knowing the density of the fluid, enables one to use other types of flow meters which require density corrections, e.g., orifice plates, mass flow meters, etc.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A device for measuring three-phase flow of gas, a first liquid, and a second liquid, comprising:
   means for measuring gas flow relative to the flow of said first and second liquids in said three-phase flow, comprising,
   first and second series connected flow meters in communication with said three-phase flow for providing respective first and second flow signals indicative of volumetric fluid flow through said first and second flow meters, respectively,
   a flow restricter located between said first and second flow meters for restricting three-phase fluid flow between said first and second flow meters, and
   first and second pressure measurement means operably coupled to respective of said first and second flow meters for providing first and second pressure signals respectively indicative of fluid pressure within said first and second flow meters;
   processing means for producing a gas flow signal indicative of gas flow in said three-phase fluid flow based at least in part on said first and second flow signals and said first and second pressure signals; and
   monitor means in communication with said three-phase flow and coupled in series with said gas flow measuring means for determining flow of said first liquid relative to flow of said gas and said second liquid and producing a first liquid flow signal indicative of flow of said first liquid relative to flow of said gas and second liquid, wherein said gas in said three-phase flow appears to said monitor means as said second liquid; and
   said processing means including means for producing, based on said gas flow signal and said first liquid flow signal, a second liquid flow signal respectively indicative of flow of said second liquid in said three-phase fluid flow.

2. A device for measuring three-phase flow of a gas, a first liquid, and a second liquid, comprising:
   means for measuring gas flow relative to the flow of said first and second liquids in said three-phase flow, comprising,
   first and second series connected flow meters in communication with said three-phase flow for providing respective first and second flow signals indicative of volumetric fluid flow through said first and second flow meters, respectively,
   a flow restricter located between said first and second flow meters for restricting three-phase fluid flow between said first and second flow meters, and
   first and second pressure measurement means operably coupled to respective of said first and second flow meters for providing first and second pressure signals respectively indicative of fluid pressure within said first and second flow meters;
   processing means for producing a gas flow signal indicative of gas flow in said three-phase fluid flow based at least in part on said first and second flow signals and said first and second pressure signals; and a density meter comprising a vertical chamber and a differential pressure transmitter in communication with said three-phase flow and coupled in series with said gas flow measuring means for measuring relative density of the three-phase flow and for producing a corresponding density output signal; and said processing means including means for producing, based at least in part on said gas flow signal and said density output signal, a first liquid flow signal and a second liquid flow signal respectively indicative of flow of said first and second liquids in said three-phase fluid flow.

* * * * *

UNITED STATES PATENT AND TRADEMARK OFFICE
CERTIFICATE OF CORRECTION

PATENT NO. : 5,099,697
DATED : 03/31/92
INVENTOR(S) : JORAM AGAR

It is certified that error appears in the above-identified patent and that said Letters Patent is hereby corrected as shown below:

Column 2, line 38, change "above mentioned" to --above-mentioned--.

Column 4, line 3, change "$Va_1=G_1\ V_2=G_2$" to --$V_1=G_1\ V_2=G_2$--;

line 6, change "$\Delta x=\Delta vmax$" to "$\Delta V=\Delta Vmax$";

line 12, change "$\Delta vmax=V/\Delta P/P_2$" to --$\Delta Vmax=V_1\Delta P/P_2$--;

line 17, delete "$\Delta V/$";

line 18, change "$\Delta v/vmax$" to --$\Delta V/\Delta Vmax$";

line 32, change "½" to --$V_2$--;

Column 5, line 8, change "$\Delta\rho$" to --$\Delta P$--;

line 11, change "$\Delta\rho$" to --$\Delta P$--;

line 29, change "coefficiency" to --coefficient--;

line 49, change "$S_1$" to --$S_0$--;

line 53, after "that" insert --the--;

UNITED STATES PATENT AND TRADEMARK OFFICE
CERTIFICATE OF CORRECTION

PATENT NO. : 5,099,697
DATED : 03/31/92
INVENTOR(S) : JORAM AGAR

It is certified that error appears in the above-identified patent and that said Letters Patent is hereby corrected as shown below:

Column 5, line 54, change "$S_{L=SV1}/L$" to --$S_L=S_{V1}/L$;

line 55, change "$S_{L\ we\ get:}$" to --$S_L$ we get from eq. 18:--;

line 63, change "ga" to --gas--.

Signed and Sealed this

Twenty-first Day of September, 1993

Attest:

BRUCE LEHMAN

Attesting Officer  Commissioner of Patents and Trademarks